United States Patent [19]
Yahiro et al.

[11] Patent Number: 5,959,036
[45] Date of Patent: Sep. 28, 1999

[54] OXYMETHYLENE COPOLYMER WITH POLY-β-ALANINE

[75] Inventors: Shyuzi Yahiro; Hirohisa Morishita, both of Kurashiki, Japan

[73] Assignee: Asahi Kasei Kogyo Kabushiki Kaisha, Osaka, Japan

[21] Appl. No.: 08/649,660

[22] PCT Filed: Feb. 21, 1995

[86] PCT No.: PCT/JP95/00249

§ 371 Date: May 20, 1996

§ 102(e) Date: May 20, 1996

[87] PCT Pub. No.: WO95/22578

PCT Pub. Date: Aug. 24, 1995

[30] Foreign Application Priority Data

Feb. 21, 1994 [JP] Japan ................................. 6-22413

[51] Int. Cl.$^6$ ................................................. C08L 59/04
[52] U.S. Cl. ........................... 525/186; 525/154; 525/187
[58] Field of Search .................... 525/398, 154, 525/186, 187

[56] References Cited

U.S. PATENT DOCUMENTS

| | | | |
|---|---|---|---|
| 4,855,365 | 8/1989 | Yamamoto et al. | 525/401 |
| 5,015,707 | 5/1991 | Yamamoto et al. | 526/212 |
| 5,191,006 | 3/1993 | Matsumoto et al. | 524/310 |
| 5,288,840 | 2/1994 | Morisita et al. | 528/238 |

FOREIGN PATENT DOCUMENTS

| | | |
|---|---|---|
| 63-108051 | 5/1988 | Japan . |
| 63-118328 | 5/1988 | Japan . |
| 2-247247 | 10/1990 | Japan . |
| 2-251535 | 10/1990 | Japan . |
| 5-5017 | 1/1993 | Japan . |

*Primary Examiner*—Robert E. Sellers

[57] ABSTRACT

Disclosed is an oxymethylene copolymer resin composition comprising (A) 100 parts by weight of an oxymethylene copolymer resin comprising a plurality of oxymethylene copolymer chains, each comprising recurring oxymethylene monomer units and oxyalkylene monomer units inserted therein, wherein the oxyalkylene monomer units, each having at least 2 carbon atoms, are present in the oxymethylene copolymer resin in an amount of from 0.05 to 0.5 mol %, based on the oxymethylene monomer units, the plurality of oxymethylene copolymer chains collectively having, as terminal groups, alkoxyl groups each having at least one carbon atom, hydroxyalkyl groups each having at least 2 carbon atoms, and formate groups; (B) 0.01 to 3.0 parts by weight of a poly-β-alanine having an average particle diameter of 6 μm or less; and (C) from 0.001 to 0.6 part by weight of an alkaline earth metal salt of a fatty acid, an aminosubstituted triazine or a hydrotalcite.

4 Claims, No Drawings

OXYMETHYLENE COPOLYMER WITH POLY-β-ALANINE

BACKGROUND OF THE INVENTION

1. Technical Field

The present invention relates to an oxymethylene copolymer resin composition. More particularly, the present invention is concerned with an oxymethylene copolymer resin composition comprising an oxymethylene copolymer resin and a poly-β-alanine, wherein the oxymethylene copolymer resin comprises a plurality of oxymethylene copolymer chains, each comprising recurring oxymethylene monomer units and oxyalkylene monomer units inserted therein in a specific ratio, wherein the oxymethylene copolymer chains have specific terminal groups, and wherein the poly-β-alanine is in a finely pulverized form. The oxymethylene copolymer resin composition of the present invention exhibits not only mechanical properties which are comparable or superior to the mechanical properties of conventional oxymethylene polymer compositions as well as conventional oxymethylene polymers, but also exhibits an excellent thermal stability which has not conventionally been achieved. The conventional oxymethylene polymers have serious disadvantages in that the unstable terminals of the oxymethylene polymer chains are susceptible to heat decomposition to form formaldehyde, and the formed formaldehyde is likely to be oxidized to thereby form formic acid. The formic acid thus formed promotes a decomposition of the main chain of the oxymethylene polymer. However, in the oxymethylene copolymer resin composition of the present invention, not only can the formation of formaldehyde which is likely to be unfavorably caused by a heat decomposition of the unstable terminals of the copolymer chains be suppressed due to the oxyalkylene monomer units inserted in the recurring oxymethylene monomer units in a specific ratio, but also the finely pulverized poly-β-alanine contained in the composition efficiently captures formaldehyde which is still likely to be generated due to the inherent difficulty in complete suppression of the formation of formaldehyde, so that the formation of formic acid (which promotes a decomposition of the main chain of the oxymethylene copolymer) can be effectively suppressed. Therefore, the thermal stability of the oxymethylene copolymer resin composition of the present invention is extremely high under oxygen-containing atmosphere conditions as compared to the thermal stability of the conventional oxymethylene polymer compositions as well as the conventional oxymethylene polymers.

2. Background Art

Conventionally, oxymethylene homopolymers have been widely used as materials for automobile parts, electrical parts, etc., since the oxymethylene homopolymers have not only a good balance of mechanical properties but also excellent fatigue resistance properties. However, the thermal stability of the conventional oxymethylene homopolymer during the molding thereof is unsatisfactory. This is because the terminal acetyl groups of the oxymethylene homopolymer are likely to be eliminated from the main chain of the homopolymer by heating, and the amount of the formed formaldehyde is increased in accordance with the advance of the decomposition of the terminals of the homopolymer. When a large amount of formaldehyde is formed, disadvantages occur such that the homopolymer is likely to suffer foaming during the molding thereof and that traces of escape of gaseous formaldehyde are left in the surface of the resultant shaped article to cause the surface appearance to be poor. Further, the formed formaldehyde is oxidized by oxygen present in the molding machine to thereby form formic acid, and the formed formic acid promotes the decomposition of the main chain of the oxymethylene homopolymer.

Unexamined Japanese Patent Application Laid-Open Specification No. 5-5017 discloses an oxymethylene copolymer exhibiting not only mechanical properties which are comparable to the mechanical properties of an oxymethylene homopolymer, but also an improved thermal stability. In this prior art document, a small amount of oxyalkylene monomer is inserted in the polymer chain of the oxymethylene homopolymer, and the amount of terminal formate groups is decreased. However, although the thermal stability of the oxymethylene copolymer in a nitrogen atmosphere is improved, the thermal stability under oxygen-containing atmosphere conditions is still poor.

Unexamined Japanese Patent Application Laid-Open Specification No. 2-247247 discloses an oxymethylene polymer composition comprising an oxymethylene polymer and a poly-β-alanine. In this composition, when the oxymethylene polymer is an oxymethylene homopolymer, the terminal acetyl groups are eliminated by heating in the molding of the composition, and the decomposition of the terminals of the polymer advances, so that the thermal stability of the composition under oxygen-containing atmosphere conditions is poor. On the other hand, when the oxymethylene polymer is a commercially available oxymethylene copolymer, the mechanical properties of the composition are poor.

SUMMARY OF THE INVENTION

In these situations, the present inventors have made extensive and intensive studies with a view toward developing an oxymethylene copolymer resin composition having not only mechanical properties which are comparable or superior to the mechanical properties of the conventional oxymethylene polymer compositions as well as the conventional oxymethylene polymers, but also an excellent thermal stability in an oxygen-containing atmosphere as compared to the thermal stability of the conventional oxymethylene polymer compositions as well as the conventional oxymethylene polymers. As a result, it has unexpectedly been found that, with respect to an oxymethylene copolymer resin composition comprising an oxymethylene copolymer resin and a poly-β-alanine, wherein the oxymethylene copolymer resin comprises a plurality of oxymethylene copolymer chains, each comprising recurring oxymethylene monomer units and oxyalkylene monomer units inserted therein, when the oxyalkylene monomer units are present in the oxymethylene monomer units in a specific ratio, and the poly-β-alanine is in a finely pulverized form, having an average particle diameter of 6 μm or less, an extremely high thermal stability of the composition can be achieved. Further, the present inventors have made studies on the above-mentioned unexpected effect of the oxymethylene copolymer resin composition of the present invention. As a result, it has been found that in the composition of the present invention, not only can the formation of formaldehyde which is likely to be unfavorably caused by a heat decomposition of the unstable terminals of the copolymer chains be suppressed due to the oxyalkylene monomer units inserted in the recurring oxymethylene monomer units in a specific ratio, but also the finely pulverized poly-β-alanine can efficiently capture formaldehyde which is still likely to be generated due to the inherent difficulty in complete suppression of the formation of formaldehyde, so that the formation of formic acid (which promotes a decomposition of the main chain of the oxymethylene copolymer) from the formaldehyde, can be effectively suppressed and, therefore, the extremely high thermal stability of the oxymethylene copolymer resin composition can be achieved. The present invention has been completed based on these findings.

Therefore, it is an object of the present invention to provide an oxymethylene copolymer resin composition exhibiting mechanical properties which are comparable or superior to the mechanical properties of the conventional oxymethylene polymer compositions as well as the conventional oxymethylene polymers, and an excellent thermal stability which has not conventionally been achieved.

DETAILED DESCRIPTION OF THE INVENTION

According to the present invention, there is provided an oxymethylene copolymer resin composition comprising:
(A) 100 parts by weight of an oxymethylene copolymer resin comprising a plurality of oxymethylene copolymer chains, each comprising recurring oxymethylene monomer units and oxyalkylene monomer units inserted therein, wherein said oxyalkylene monomer units, each having at least 2 carbon atoms, are present in the oxymethylene copolymer resin in an amount of from 0.05 to 0.5 mol %, based on the oxymethylene monomer units, the plurality of oxymethylene copolymer chains collectively having, as terminal groups, alkoxyl groups each having at least one carbon atom, hydroxyalkyl groups each having at least 2 carbon atoms, and formate groups; and (B) 0.01 to 3.0 parts by weight of a poly-β-alanine having an average particle diameter of 6 $\mu$m or less.

In the oxymethylene copolymer resin of the oxymethylene copolymer resin composition of the present invention, the amount of the oxyalkylene monomer units inserted in the recurring oxymethylene monomer units is important. The amount of the oxyalkylene monomer units inserted in the recurring oxymethylene monomer units is from 0.05 to 0.5 mol %, preferably, from 0.1 to 0.4 mol %, based on the oxymethylene monomer units. When the amount of the oxyalkylene monomer units inserted in the oxymethylene monomer units is smaller than 0.05 mol %, the amount of formaldehyde formed by a heat decomposition of the oxymethylene monomer units in an oxygen-containing atmosphere becomes undesirably large. In this case, even when a poly-β-alanine is added to the oxymethylene copolymer resin, the amount of formaldehyde formed by the heat decomposition of the oxymethylene monomer units is so large that the poly-β-alanine cannot satisfactorily capture the formed formaldehyde. Further, since the formed formaldehyde is likely to be oxidized to form formic acid which promotes a decomposition of the main chain of the oxymethylene copolymer in an oxygen-containing atmosphere, the thermal stability of the resin composition becomes poorer. On the other hand, when the amount of the oxyalkylene monomer units is larger than 0.5 mol %, the mechanical properties of the resin composition are markedly lowered.

The amount of the oxyalkylene monomer units inserted in the oxymethylene monomer units can be determined as follows. The oxymethylene copolymer resin is subjected to heat decomposition in a 3 N aqueous solution of hydrochloric acid, and the amount of the oxyalkylene monomer units is determined by analyzing alkylene glycol formed in the resultant aqueous solution.

With respect to the terminal groups of the oxymethylene copolymer chain in the resin composition of the present invention, explanation is made below.

In the present invention, the plurality of the oxymethylene copolymer chains collectively have, as terminal groups, alkoxyl groups (such as methoxyl group), hydroxyalkyl groups (such as hydroxyethyl group) and formate groups.

The terminal alkoxyl groups having at least one carbon atom are derived from a formal which is used as a molecular weight modifier in the copolymerization described below. For example, methylal [$(CH_3O)_2CH_2$] is generally used as a molecular weight modifier. In this instance, methoxyl groups are formed as terminal groups. There is no particular limitation with respect to the number of carbon atoms of each terminal alkoxyl group. However, from the viewpoint of ease in synthesis and purification of a formal as a molecular weight modifier, each terminal alkoxyl group independently has preferably 1 to 10 carbon atoms, more preferably 1 to 3 carbon atoms.

The terminal hydroxyalkyl groups, such as hydroxyethyl group (—$CH_2CH_2OH$) and hydroxybutyl group, are derived from a cyclic ether or cyclic formal, which is one of the raw materials for producing the oxymethylene copolymer. The terminal hydroxyalkyl groups are formed as follows. During the production of an oxymethylene copolymer resin comprising recurring oxymethylene monomer units and oxyalkylene monomer units (which are derived from a cyclic ether or cyclic formal) inserted therein is produced, due to the presence of a small amount of water in raw materials for producing the oxymethylene copolymer, hydroxymethyl groups (which are unstable under heated conditions) are inevitably formed as terminal groups. As described below in detail, when the produced oxymethylene copolymer resin having unstable terminal hydroxymethyl groups is subjected to post-treatment, for example, heat treatment in an aqueous solution of an alkaline substance (such as triethylamine), the unstable terminals (having terminal hydroxymethyl groups) of the oxymethylene copolymer chains are decomposed. This decomposition of the terminals of the copolymer chains proceeds toward the inner portion of the main chain of the copolymer, and the decomposition terminates at a site where an oxyalkylene monomer unit is located, so that the oxyalkylene monomer unit at such a site is changed to a stable terminal hydroxyalkyl group, such as hydroxyethyl group, hydroxybutyl group or the like. There is no particular limitation with respect to the number of carbon atoms of each terminal hydroxyalkyl group. However, generally, each terminal hydroxyalkyl group has at least two carbon atoms. From the viewpoint of each in synthesis and purification of a cyclic ether and cyclic formal as raw materials, it is preferred that each terminal hydroxyalkyl group independently have 2 to 10 carbon atoms. When the oxymethylene copolymer chain has a terminal hydroxymethyl group, the terminal hydroxymethyl group is eliminated from the copolymer chain by heat during the molding, so that the decomposition of the terminals of the copolymer chain proceeds while forming formaldehyde. When the above-mentioned unstable terminal hydroxymethyl groups are largely present in the oxymethylene copolymer resin, a large amount of formaldehyde is necessarily formed by the heat decomposition, so that even if a poly-β-alanine is added to the oxymethylene copolymer resin, the amount of the formaldehyde, which cannot be captured by the poly-β-alanine, becomes large. Further, the formed formaldehyde reacts with oxygen present in the molding machine to thereby produce formic acid (which promotes the decomposition of the main chain of the oxymethylene copolymer), so that the thermal stability of the oxymethylene copolymer resin composition becomes poor. In the present invention, it is preferred that the unstable terminals having terminal hydroxymethyl groups are changed to stable terminals to a degree such that the oxymethylene copolymer resin exhibits a weight decrease ratio R of 3% or less as measured by heating the oxymethylene copolymer resin at a temperature of 230° C. for 100 minutes in a nitrogen atmosphere. The above-mentioned weight decrease ratio R is defined by the following formula:

$$R\ (\%) = \frac{W_1 - W_2}{W_1} \times 100$$

wherein $W_1$ is the weight of the oxymethylene copolymer resin before the heating, and $W_2$ is the weight of the oxymethylene copolymer resin after the heating.

The terminal formate groups (—OOCH) are formed by the decomposition of a main chain of the oxymethylene copolymer, which is caused by a hydride shift reaction (see, for example, H. D. Herman, E. Fisher, K. Weissermel, Macromol Chem., 90, p. 1, 1966) which occurs as a side reaction during the copolymerization. The ratio of the terminal formate groups can be expressed in terms of the absorbance ratio $D_{1710}/D_{1470}$ in the infrared absorption spectrum, wherein the absorbance $D_{1710}$ at the wave number of 1710 cm$^{-1}$ is ascribed to the terminal formate groups and the absorbance $D_{1470}$ at the wave number of 1470 cm$^{-1}$ is ascribed to the oxymethylene groups. Each of absorbances $D_{1710}$ and $D_{1470}$ of the oxymethylene copolymer can be obtained by a method in which the oxymethylene copolymer resin (A) is hot-pressed to obtain a film, and an infrared absorption spectrum was taken with respect to the film. It is preferred that the amount of the terminal formate groups in the oxymethylene copolymer resin be in an amount such that a relationship defined by the formula $D_{1710}/D_{1470} \leq 0.025$ can be satisfied, more preferably in an amount such that a relationship defined by the formula $D_{1710}/D_{1470} \leq 0.02$ can be satisfied. When the $D_{1710}/D_{1470}$ ratio is more than 0.025, formaldehyde is formed in a large amount by a heat decomposition of the terminals of the oxymethylene copolymer chains (which heat decomposition is caused by the elimination of the terminal formate groups), so that even if a poly-β-alanine is added to the oxymethylene copolymer resin, the amount of the formaldehyde, which cannot be captured by the poly-β-alanine, becomes large. Further, as mentioned above, the formed formaldehyde is oxidized with oxygen present in the molding machine to thereby form formic acid (which promotes the decomposition of the main chain of the oxymethylene copolymer), so that the thermal stability of the oxymethylene copolymer resin composition becomes poor.

Hereinbelow, explanation is made with respect to the method for producing the oxymethylene copolymer resin composition of the present invention.

For producing the oxymethylene copolymer resin to be used in the present invention, formaldehyde or trioxane is copolymerized with a cyclic ether or a cyclic formal using a cation polymerization catalyst. The cyclic ether to be used in the present invention is represented by formula (I):

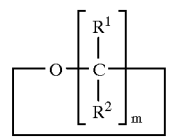

wherein each of $R^1$ and $R^2$ independently represents a hydrogen atom, a $C_1$–$C_4$ alkyl group or a $C_6$–$C_{12}$ aryl group, and m represents an integer of from 2 to 6.

The cyclic formal to be used in the present invention is represented by formula (II):

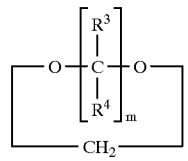

wherein each of $R^3$ and $R^4$ independently represents a hydrogen atom, a $C_1$–$C_4$ alkyl group or a $C_6$–$C_{12}$ aryl group, and m represents an integer of from 2 to 6.

Examples of cyclic ethers represented by formula (I) above include ethylene oxide, propylene oxide, butylene oxide and styrene oxide. Of these, ethylene oxide is especially preferred.

Examples of cyclic formals represented by formula (II) above include ethylene glycol formal (1,3-dioxolane), diethylene glycol formal, 1,3-propanediol formal, 1,4-butanediol formal, 1,5-pentanediol formal and 1,6-hexanediol formal. Of these, ethylene glycol formal (1,3-dioxolane) and 1,4-butanediol formal are especially preferred.

The number of carbon atoms of each of the cyclic ether and cyclic formal is not particularly limited. However, from the viewpoint of ease in synthesis and purification of a cyclic ether and cyclic formal, it is preferred that the cyclic ether have 2 to 10 carbon atoms and that the cyclic formal have 3 to 11 carbon atoms.

The above-mentioned cyclic ethers and cyclic formals may be used individually or in combination.

In the present invention, when formaldehyde is used as a raw material for forming the oxymethylene monomer units, the cyclic ether or cyclic formal is used in an amount of from 0.05 to 0.8 mol %, based on the formaldehyde, and when trioxane is used as a raw material for forming the oxymethylene monomer units, the cyclic ether or cyclic formal is used in an amount of from 0.15 to 2.5 mol %, based on the trioxane.

Examples of cation polymerization catalysts which are used for obtaining the oxymethylene copolymer resin to be used in the present invention include Lewis acids, such as boron trifluoride, tin tetrachloride, titanium tetrachloride, phosphorus pentafluoride and phosphorus pentachloride, and complexes or salts thereof; and superstrong acids, such as trifluoromethanesulfonic acid, pentafluoroethanesulfonic acid, heptafluoropropanesulfonic acid, nonafluorobutanesulfonic acid, undecafluoropentanesulfonic acid and perfluoroheptanesulfonic acid, and derivatives thereof. Specific examples of complexes of boron trifluoride include boron trifluoride dibutyl ether. Examples of derivatives of superstrong acids include anhydrides, alkyl esters and alkyl silyl esters of superstrong acids. Specific examples of superstrong acid anhydrides include trifluoromethanesulfonic acid anhydride, pentafluoroethanesulfonic acid anhydride, heptafluoropropanesulfonic acid anhydride, nonafluorobutanesulfonic acid anhydride, undecafluoropentanesulfonic acid anhydride and perfluoroheptanesulfonic acid anhydride. Specific examples of alkyl esters of superstrong acids include methyl trifluoromethanesulfonate, ethyl trifluoromethanesulfonate, methyl pentafluoroethanesulfonate and methyl heptafluoropropanesulfonate. Specific examples of alkyl silyl esters of superstrong acids include trimethylsilyl trifluoromethanesulfonate and trietylsilyl trifluoromethanesulfonate. Of the above cation polymerization catalysts, boron trifluoride, complexes of boron trifluoride (e.g., boron trifluoride dibutyl ether), and trifluoromethanesulfonic acid and a derivative thereof, are especially preferred.

With respect to the concentration of the cation polymerization catalyst, when the catalyst is, for example, boron trifluoride or a complex thereof, the catalyst concentration is preferably $5\times10^{-6}$ to $5\times10^{-5}$ mol, more preferably $0.5\times10^{-5}$ to $4\times10^{-5}$ mol per mol of the total of the raw materials, i.e., formaldehyde or trioxane and a cyclic ether or a cyclic formal. On the other hand, when the catalyst is trifluorosulfonic acid or a derivative thereof, the catalyst concentration is preferably $1\times10^{-8}$ to $5\times10^{-7}$ mol, more preferably $3\times10^{-8}$ to $5\times10^{-8}$ mol per mol of the total of the raw materials, i.e., formaldehyde or trioxane and a cyclic ether or a cyclic formal. When the catalyst concentration is lower than the above-mentioned range, the yield of the oxymethylene copolymer resin becomes low. On the other hand, when the catalyst concentration is higher than the above-mentioned range, the oxymethylene copolymer resin undergoes acid decomposition by the action of the cation polymerization catalyst remaining in the oxymethylene copolymer resin, leading to a lowering of the thermal stability of the resin. Further, when the concentration of the cation polymerization catalyst is too high, the hydride shift reaction is likely to vigorously occur during the polymerization and hence the amount of the terminal formate groups is increased, so that $D_{1710}$ and $D_{1470}$ cannot satisfy the relationship defined by the formula $D_{1710}/D_{1470} \leq 0.025$.

With respect to the polymerization apparatus to be used in the present invention, there is no particular limitation, and the polymerization apparatus may be of a batch type or of a continuous type. As a batch type polymerization apparatus, a reaction vessel having a stirrer can generally be used. As a continuous type polymerization apparatus, a self-cleaning type mixer, such as a co-kneader, a twin-screw continuous extrusion kneader or a twin-paddle type continuous mixer, can be used. The polymerization can be conducted at 60 to 200° C., preferably 60 to 140° C., under atmospheric pressure. With respect to the time for the polymerization, there is no particular limitation. However, in general, the polymerization time is in the range from 10 seconds to 100 minutes. After the polymerization, the catalyst remaining in the obtained polymer causes a depolymerization of the polymer. Therefore, the remaining catalyst is usually deactivated. As a method for the deactivation of a catalyst, there can be generally employed a method in which the catalyst is contacted with an aqueous solution of a basic compound, such as triethylamine, or with an organic solvent, thereby neutralizing and deactivating the catalyst, or a method in which a basic compound is simply added to the reaction mixture, thereby neutralizing and deactivating the catalyst.

As described above, an oxymethylene copolymer resin as produced in the above-mentioned manner has an unstable molecular terminal which contains a hydroxymethyl group. The unstable terminal can be changed to a stable terminal by a customary method. For example, an oxymethylene copolymer resin having an unstable molecular terminal can be heat-treated at 180 to 250° C. for 30 seconds to 20 minutes together with an alkaline substance, such as an aqueous triethylamine solution, to thereby change an unstable terminal hydroxymethyl group to a stable hydroxyalkyl group, such as a hydroxyethyl group or a hydroxybutyl group, thus stabilizing the molecular terminals. As described above, with respect to the stabilization of molecular terminals, it is preferred that unstable terminals containing hydroxymethyl groups be changed to stable terminals to a degree such that the oxymethylene copolymer resin exhibits a weight decrease ratio (R) of 3% or less as measured by heating the oxymethylene copolymer resin at 230° C. for 100 minutes in a nitrogen atmosphere. For this purpose, various measures may be adopted. For example, measures that may be adopted include prolonging the time of stabilization treatment or increasing the concentration of an alkaline substance used for stabilization treatment. As mentioned above, when oxyalkylene monomer units are present in the oxymethylene copolymer resin in an amount of less than 0.05 mol %, based on the oxymethylene monomer units, the thermal stability of the oxymethylene copolymer resin becomes poor. Therefore, in such a case, the change of unstable molecular terminals containing hydroxymethyl groups to stable terminals cannot be conducted to a satisfactory degree due to the poor thermal stability of the copolymer, so that the oxymethylene copolymer resin cannot exhibit a weight decrease ratio (R) of 3% or less as measured by heating the oxymethylene copolymer resin at 230° C. for 100 minutes in a nitrogen atmosphere.

The oxymethylene copolymer resin composition of the present invention has a number average molecular weight of about 3,000 to about 200,000, and has a melt index of about 0.5 to about 200 g/10 minutes as measured at 190° C. in accordance with ASTM D1238.

In the oxymethylene copolymer resin composition of the present invention, as component (B), a finely pulverized poly-β-alanine having an average particle diameter of 6 μm or less is used. By using such a finely pulverized poly-β-alanine, formaldehyde can be captured efficiently. As a poly-β-alanine which can be used in the present invention, there can be mentioned poly-β-alanines disclosed, for example, in U.S. Pat. No. 4,855,365, Examined Japanese Patent Application Publication No. 4-4340, and Unexamined Japanese Patent Application Laid-Open Specification Nos. 63-118328, 2-251535 and 3-234729.

The above-mentioned poly-β-alanine is a copolymer which comprises two different types of recurring acrylamide monomer units of formulae (I) and (II):

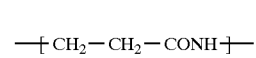

(I)

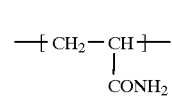

(II)

The amido groups of the poly-β-alanine react with formaldehyde formed by a heat decomposition of the oxymethylene copolymer chain, thereby capturing the formaldehyde.

Further, the poly-β-alanine may be a copolymer of acrylamide with a vinyl group-containing monomer other than acrylamide. Examples of vinyl group-containing monomers other than acrylamide include n-butyl methacrylate, isobutyl methacrylate, stearyl methacrylate, divinylbenzene, ethylenebisacrylamide and N,N'-methylenebisacrylamide. Of these, N,N'-methylenebisacrylamide is especially preferred.

The poly-β-alanine to be used in the present invention can be obtained by polymerizing acrylamide, optionally with the above-mentioned vinyl group-containing monomer, in the presence of a metal alcoholate, such as calcium alkoxide and zirconium alkoxide.

In the present invention, after a poly-β-alanine is produced by the above-described method, it is necessary that the poly-β-alanine be rendered particulate so as to have an average particle diameter of 6 μm or less. The poly-β-alanine to be used in the present invention is infusible at the molding temperature of an oxymethylene copolymer resin composition, so that, during molding, the smaller the average particle diameter of the poly-β-alanine, the larger the surface area of the poly-β-alanine per unit weight. A poly-β-alanine having a large surface area per unit weight can efficiently capture formaldehyde which is formed when an oxymethylene copolymer resin is exposed to heat in an oxygen-containing atmosphere. By the addition of a poly-β-alanine having an average particle diameter of 6 μm or less, the amount of formaldehyde (which is likely to be oxidized to form formic acid) can be decreased and hence the formation of formic acid is suppressed, so that the thermal stability of the oxymethylene copolymer resin composition in an oxygen-containing atmosphere is improved. By contrast, when the poly-β-alanine employed has an average particle diameter of more than 6 μm, formaldehyde formed when the oxymethylene copolymer resin is exposed to heat in an oxygen-containing atmosphere cannot be efficiently captured, so that a large amount of the poly-μ-alanine is need. When a large amount of a poly-μ-alanine is used, the oxymethylene copolymer resin composition undergoes discoloration during the molding to assume an unintended color, so that the appearance of the resultant shaped article becomes poor. The amount of the poly-β-alanine to be used in the present invention is 0.01 to 3.0 parts by weight, preferably 0.1 to 0.5 part by weight per 100 parts by weight of the oxymethylene copolymer resin. When the amount of the poly-β-alanine is less than 0.01 part by weight per 100 parts by weight of the oxymethylene copolymer resin, the amount of formaldehyde formed at the time of molding cannot be satisfactorily decreased. On the other hand, when the amount of the poly-β-alanine is larger than 3.0 parts by weight, as mentioned above, the oxymethylene copolymer resin composition undergoes discoloration during the molding to assume an unintended color, so that the appearance of the resultant shaped article becomes poor.

The oxymethylene copolymer resin composition of the present invention may further contain a specific basic substance in addition to the oxymethylene copolymer resin and the poly-β-alanine. Such a specific basic substance is advantageously used to neutralize formic acid (which is formed in a small amount when the oxymethylene copolymer resin composition is heated in an oxgen-containing atmosphere), so that the decomposition of the main chain of the oxymethylene copolymer is suppressed.

Examples of specific basic substances include an alkaline earth metal salt of an organic fatty acid (having preferably from 5 to 40 carbon atoms, more preferably 8 to 25 carbon atoms), an amino-substituted triazine and a hydrotalcite.

Specific examples of organic fatty acids include lauric acid, stearic acid, ricinolic acid, behenic acid, lignoceric acid, carotenic acid, montanic acid and melissic acid, and substitution products of these fatty acids with a hydroxyl group. Specific examples of alkaline earth metals include magnesium, calcium and beryllium.

Of the above-mentioned alkaline earth metal salts of organic fatty acids, calcium stearate is especially preferred.

Examples of amino-substituted triazine include guanamine (2,4-diamino-sym-triazine), melamine (2,4,6-triamino-sym-triazine), N-butylmelamine, N-phenylmelamine, N,N-diphenylmelamine, N,N-diallylmelamine, N,N',N"-triphenylmelamine, N-methylolmelamine, N,N'-dimethylolmelamine, N,N',N"-trimethylolmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine and N,N',N"-tetracyanoethylbenzoguanamine.

Examples of hydrotalcites include a natural hydrotalcite represented by the formula: $Mg_{0.75}Al_{0.25}(OH)_2Co_{3\ 0.125}.0.5H_2O$, and a synthesized hydrotalcite represented by, for example, the formula: $Mg_{4.5}Al_2(OH)_{13}Co_3.3.5H_2O$. These hydrotalcites may be those which have been treated to remove water of crystallization thereof.

The above-mentioned basic substance can be incorporated in the oxymethylene copolymer resin composition of the present invention in an amount of 0.001 to 0.6 part by weight, preferably 0.01 to 0.3 part by weight, per 100 parts by weight of the oxymethylene copolymer resin. When the amount of the basic substance is larger than 0.6 part by weight, the oxymethylene copolymer resin composition is likely to suffer discoloration during the molding to assume an unintended color, so that the appearance of the resultant shaped article becomes poor. On the other hand, when the amount of the basic substance is less than 0.001 part by weight, almost no effect of neutralizing formic acid is obtained.

In the composition of the present invention, various additives and agents which are used in conventional resin compositions containing an oxymethylene homopolymer or oxymethylene copolymer, can be incorporated. Examples of such additives and agents include an antioxidant, an ultraviolet absorber, a light stabilizer, a lubricant, a mold-release agent, a pigment and an inorganic filler. These additives and agents can be used individually or in combination.

With respect to the method for preparing the composition of the present invention, there is no particular limitation. For example, with respect to the form of the basic substance and additives to be added to the composition of the present invention, the basic substance and additives may be in a powdery form or may be in a molten form. In general, the composition can be prepared by charging the oxymethylene copolymer resin, the poly-β-alanine and any additives together into an extruder and kneading the same. The kneader may be of a single-screw type or may be of a twin-screw type. The extrusion temperature can be appropriately selected from the range of 180 to 240° C.

BEST MODE FOR CARRYING OUT THE INVENTION

Hereinbelow, the present invention will be described in more detail with reference to the following Referential Examples, Examples and Comparative Examples, but they should not be construed as limiting the scope of the present invention.

In the Examples and Comparative Examples, various measurements were conducted by the following methods.

(1) Amount of oxyalkylene monomer units inserted:

10 g of an oxymethylene copolymer resin is placed in 100 ml of an aqueous 3 N HCl solution, and the whole is heated in a sealed vessel at 120° C. for 2 hours to thereby decompose the oxymethylene copolymer resin. After cooling the resultant reaction mixture, the amount of alkylene glycol present therein is measured by gas chromatography (by means of a flame ionization detector, i.e., FID), to determine the amount of oxyalkylene monomer units. The amount of oxyalkylene monomer units is expressed in terms of mol %, based on the oxymethylene monomer units.

(2) Weight decrease ratio R (%) as measured by heating an oxymethylene copolymer resin at a temperature of 230° C. for 100 minutes in a nitrogen atmosphere:

1 g of an oxymethylene copolymer resin is placed in a 10 ml glass flask equipped with a nitrogen introduction tube. Then, the flask containing the copolymer resin is immersed in an oil bath at 230° C. and allowed to stand therein for 100 minutes while introducing nitrogen at a rate of 10 liters/hour. After that period of time, the weight (g) of the oxymethylene copolymer resin is measured. The weight decrease ratio R of the oxymethylene copolymer resin is defined by the formula $$R\ (\%) = \frac{W_1 - W_2}{W_1} \times 100$$

wherein $W_1$ is the weight of the oxymethylene copolymer resin before the heating, and $W_2$ is the weight of the oxymethylene copolymer resin after the heating.

(3) Flexural modulus:

An oxymethylene copolymer resin composition is molded by means of an injection molding machine (IS-100E-3A, manufactured and sold by Toshiba Kikai Co., Japan) under the following conditions.

Clamping pressure: 100 ton
Injection pressure: 700 kgf/cm$^2$
Injection rate: 5 cm/sec
Injection time (sec)/cooling time (sec): 10/5
Cylinder temperature: 210° C.
Revolution number of screws: 100 rpm
Mold temperature: 40° C.

With respect to the obtained shaped article, a flexural modulus is measured in accordance with ASTM-D-790.

(4) Amount ratio of terminal formate groups ($D_{1710}/D_{1470}$):

An oxymethylene copolymer resin is subjected to hot pressing at 200° C. to thereby obtain a film having a thickness of 15 μm. An infrared absorption spectrum of the film is obtained. From the infrared absorption spectrum, the ratio of an absorbance at the wave number of 1710 cm$^{-1}$ to an absorbance at the wave number of 1470 cm$^{-1}$, i.e., $D_{1710}/D_{1470}$ ratio is calculated.

(5) Thermal stability of an oxymethylene copolymer resin composition in an oxygen-containing atmosphere:

A weight decrease of an oxymethylene copolymer resin composition is measured by means of a thermobalance. Specifically, an oxymethylene copolymer resin composition is kept at 230° C. in air, using a thermogravity analyzer (TGA-7 manufactured and sold by Perkin-Elmer, U.S.A.), while measuring a decrease in weight. In terms of the period of time required for the weight to decrease by 20%, based on the original weight, the thermal stability of the oxymethylene copolymer resin composition in an oxygen-containing atmosphere is evaluated. The longer the above-mentioned period of time, the higher the thermal stability in an oxygen-containing atmosphere.

REFERENTIAL EXAMPLE 1

Production of Oxymethylene Copolymer Resins (1) Production of sample A:

2000 g of highly purified trioxane (water content: 2 ppm; formic acid content: 3 ppm), 1,3-dioxolan (0.8 mol %, based on the trioxane) and methylal (0.2 mol %, based on the trioxane) were charged into a kneader having 2 sigma blades and a jacket, and the internal temperature of the kneader was elevated to 70° C. Then, a (0.002 mol/liter) cyclohexane solution of boron trifluoride dibutyl ether was added in an amount such that its final concentration became 0.15×10$^{-4}$ mol per mol of the total of the trioxane and 1,3-dioxolan, and a reaction was conducted. 30 minutes after the start of the reaction, 1 liter of an aqueous 30% triethylamine solution was added to thereby deactivate the catalyst and terminate the reaction. The obtained reaction mixture was further kneaded for 1 hour. Then, the content of the kneader was taken out and subjected to filtration, thereby obtaining an oxymethylene copolymer resin to be subsequently treated for stabilizing terminals thereof (hereinafter, frequently referred to as "crude oxymethylene copolymer resin"). The obtained crude oxymethylene copolymer resin was dried at 100° C. 100 parts by weight of the crude oxymethylene copolymer resin was mixed with 3 parts by weight of an aqueous triethylamine solution (composed of 0.5 part by weight of triethylamine and 2.5 parts by weight of water) and 0.2 part by weight of 2,2-methylenebis-(4-methyl-6-t-butylphenol) and the resultant mixture was subjected to extrusion, using a vented, single-screw extruder (residence time: 300 seconds), to thereby change unstable terminals of the molecules to stable terminals, thereby obtaining an oxymethylene copolymer resin (sample A)(extrusion temperature: 200° C.; vent pressure: 200 torr). The obtained oxymethylene copolymer resin had a melt index of 9.5 g/10 min as measured at 190° C. in accordance with ASTM D1238.

(2) Production of samples B to G:

Substantially the same procedure as in item (1) above was repeated except that the type and amount of the comonomer were varied, thereby obtaining 6 types of oxymethylene copolymer resins (samples B to G). The type and amount of the comonomer employed for producing samples B to G are indicated in Tables 1 and 2. All of the obtained 6 types of oxymethylene copolymer resins had a melt index of 9.5 g/10 min as measured at 190° C. in accordance with ASTM D1238.

With respect to each of samples A to G, the amount ratio of terminal formate groups ($D_{1710}/D_{1470}$), the amount of oxyalkylene monomer units inserted and the weight decrease ratio R as measured by heating the oxymethylene copolymer resin at a temperature of 230° C. for 100 minutes in a nitrogen atmosphere are shown in Tables 1 and 2.

REFERENTIAL EXAMPLE 2

Production of Poly-β-alanines 4.5 kg of acrylamide, 0.5 kg of N,N'-methylenebisacrylamide and 1.008 g of zirconium tetraisopropoxide (the molar amount of the zirconium tetraisopropoxide was 1/20,000 of the total molar amount of the monomers) were charged into a Werner-type, 30 liter batch kneader (manufactured and sold by Yoshida Seisakusho, Japan), and reacted at 125° C. for 4 hours. The resultant solid reaction mixture was taken out of the kneader and pulverized. In the pulverization, the pulverization time and force were varied so that various poly-β-alanines having different average particle diameters (for example, 2.5 μm) as indicated in Tables 1 and 2, were obtained.

EXAMPLES 1 to 14

Samples A to E were individually mixed with a poly-β-alanine and a basic substance as shown in Table 1, and the resultant mixture was melt-kneaded in a twin-screw extruder having a cylinder temperature set at 200° C., and the kneaded mixture was pelletized, thereby obtaining a pelletized oxymethylene copolymer resin composition. With respect to each of the obtained oxymethylene copolymer resin compositions, the time required for the weight of the composition to decrease by 20% (based on the original weight when heated at 230° C. in an oxygen-containing atmosphere), and the flexural modulus [measured with respect to the shaped articles produced from the above-mentioned oxymethylene copolymer resin compositions by the method described in item (3) above] are shown in Table 1. As apparent from Table 1, the obtained oxymethylene copolymer resin compositions had high mechanical properties and thermal stability in an oxygen-containing atmosphere.

COMPARATIVE EXAMPLE 1

A composition was produced in substantially the same manner as in Example 1 except that a commercially available oxymethylene homopolymer (Tenac 5000, manufactured and sold by Asahi Chemical Industry Co., Ltd., Japan) (terminal groups: acetyl groups) was mixed with a poly-β-alanine indicated in Table 2. Next, various measurements were conducted in the same manner as in Example 1. Results are shown in Table 2. The oxymethylene homopolymer obtained had terminal acetyl groups, which were easily decomposed by heat to produce a large amount of formaldehyde. The formed formaldehyde underwent oxidation to form formic acid, so that the oxymethylene homopolymer resin composition had poor thermal stability in an oxygen-containing atmosphere.

COMPARATIVE EXAMPLE 2

A composition was produced in substantially the same manner as in Example 1, except that a commercially available oxymethylene copolymer resin (Tenac 4520, manufactured and sold by Asahi Chemical Industry Co., Ltd., Japan) (the amount of oxyalkylene monomer units inserted: 1.6 mol %) was mixed with a poly-β-alanine indicated in Table 2. Next, various measurements were conducted in the same manner as in Example 1. Results are shown in Table 2. The obtained oxymethylene copolymer resin composition was poor in mechanical properties.

COMPARATIVE EXAMPLE 3

A composition was produced in substantially the same manner as in Example 1, except that an oxymethylene copolymer resin (sample F) (the amount of oxyalkylene monomer units inserted: 0.03 mol %) was mixed with a poly-β-alanine indicated in Table 2. Next, various measurements were conducted in the same manner as in Example 1. Results are shown in Table 2. The treatment of the oxymethylene copolymer resin for changing its unstable terminals to stable terminals could not be satisfactorily conducted. As a result, the amount of formaldehyde formed by a heat decomposition of the unstable terminals of the oxymethylene copolymer resin was large. The formed formaldehyde underwent oxidation to form formic acid, so that the oxymethylene copolymer resin composition had poor thermal stability in an oxygen-containing atmosphere.

COMPARATIVE EXAMPLE 4

A composition was produced in substantially the same manner as in Example 1, except that an oxymethylene copolymer resin (sample G) (the amount of oxyalkylene monomer units inserted: 0.8 mol %) was mixed with a poly-β-alanine indicated in Table 2. Next, various measurements were conducted in the same manner as in Example 1. Results are shown in Table 2. The obtained oxymethylene copolymer resin composition was poor in mechanical properties.

COMPARATIVE EXAMPLE 5

Various measurements were conducted in the same manner as in Example 1 with respect to an oxymethylene copolymer resin (sample A) (the amount of oxyalkylene monomer units inserted: 0.2 mol %) which was not mixed with a poly-β-alanine. Results are shown in Table 2. Because the oxymethylene copolymer resin was not mixed with a poly-β-alanine, the amount of formaldehyde formed by a heat decomposition was large, and the formed formaldehyde underwent oxidation to form formic acid, so that the oxymethylene copolymer resin had poor thermal stability in an oxygen-containing atmosphere.

COMPARATIVE EXAMPLE 6

A composition was produced in substantially the same manner as in Example 1, except that an oxymethylene copolymer resin (sample A) (the amount of oxyalkylene monomer units inserted: 0.2 mol %) was mixed with 0.003 part by weight of a poly-β-alanine indicated in Table 2. Various measurements were conducted in the same manner as in Example 1. Results are shown in Table 2. Because the amount of the poly-β-alanine was too small, the formaldehyde formed by a heat composition was not satisfactorily captured, and the formed formaldehyde underwent oxidation to form formic acid, so that the oxymethylene copolymer resin composition had poor thermal stability in an oxygen-containing atmosphere.

COMPARATIVE EXAMPLE 7

A composition was produced in substantially the same manner as in Example 1, except that an oxymethylene copolymer resin (sample A) (the amount of oxyalkylene monomer units inserted: 0.2 mol %) was mixed with 5 parts by weight of a poly-β-alanine indicated in Table 2. Various measurements were conducted in the same manner as in Example 1. Results are shown in Table 2. Because the amount of the poly-β-alanine was too large, a shaped article made from the produced composition became yellowish by discoloration.

COMPARATIVE EXAMPLE 8

A composition was produced in substantially the same manner as in Example 1, except that an oxymethylene copolymer resin (sample A) (the amount of oxyalkylene monomer units inserted: 0.2 mol %) was mixed with 0.3 part by weight of a poly-β-alanine (having an average particle diameter of 30 μm) indicated in Table 2. Various measurements were conducted in the same manner as in Example 1. Results are shown in Table 2. The formaldehyde formed by a heat decomposition could not be satisfactorily captured, and the formed formaldehyde underwent oxidation to form formic acid, so that the oxymethylene copolymer resin composition had poor thermal stability in an oxygen-containing atmosphere.

TABLE 1

| | Oxymethylene copolymer resin | Comonomer | Amount of oxyalkylene monomer units inserted (mol %) | Amount ratio of terminal formate groups ($D_{1710}/D_{1470}$) | Weight decrease ratio R (%) as measured by heating oxymethylene copolymer resin at 230° C. for 100 minutes in nitrogen atmosphere |
|---|---|---|---|---|---|
| Example 1 | Sample A | 1,3-dioxolane | 0.2 | 0.015 | 0.8 |
| Example 2 | Sample B | 1,3-dioxolane | 0.1 | 0.017 | 1.5 |
| Example 3 | Sample C | 1,3-dioxolane | 0.4 | 0.013 | 0.4 |
| Example 4 | Sample D | 1,3-dioxolane | 0.15 | 0.018 | 1.0 |
| Example 5 | Sample D | 1,3-dioxolane | 0.15 | 0.018 | 1.0 |
| Example 6 | Sample D | 1,3-dioxolane | 0.15 | 0.018 | 1.0 |
| Example 7 | Sample D | 1,3-dioxolane | 0.15 | 0.018 | 1.0 |
| Example 8 | Sample D | 1,3-dioxolane | 0.15 | 0.018 | 1.0 |
| Example 9 | Sample E | 1,4-butanediol formal | 0.1 | 0.020 | 1.6 |
| Example 10 | Sample D | 1,3-dioxolane | 0.15 | 0.018 | 1.0 |
| Example 11 | Sample D | 1,3-dioxolane | 0.15 | 0.018 | 1.0 |
| Example 12 | Sample D | 1,3-dioxolane | 0.15 | 0.018 | 1.0 |
| Example 13 | Sample D | 1,3-dioxolane | 0.15 | 0.018 | 1.0 |
| Example 14 | Sample D | 1,3-dioxolane | 0.15 | 0.018 | 1.0 |

| | Poly-β-alanine | | Basic substance | | | Time required for weight of oxymethylene copolymer resin composition to decrease by 20%, based on the original weight, at 230° C. in an oxygen-containing atmosphere (min) |
|---|---|---|---|---|---|---|
| | Average particle diameter (μm) | Amount (part by weight) | Type | Amount (part by weight) | Flexural modulus (kg/cm²) | |
| Example 1 | 2.5 | 0.2 | — | — | 29,000 | 100 |
| Example 2 | 2.5 | 0.2 | — | — | 30,000 | 80 |
| Example 3 | 2.5 | 0.2 | — | — | 28,000 | 150 |
| Example 4 | 2.5 | 0.2 | — | — | 29,000 | 90 |
| Example 5 | 2.5 | 0.02 | — | — | 29,000 | 60 |
| Example 6 | 2.5 | 0.5 | — | — | 29,000 | 180 |
| Example 7 | 5 | 0.2 | — | — | 29,000 | 60 |
| Example 8 | 1 | 0.2 | — | — | 29,000 | 130 |
| Example 9 | 2.5 | 0.2 | — | — | 30,000 | 80 |
| Example 10 | 2.5 | 0.2 | Calcium stearate | 0.05 | 29,000 | 180 |
| Example 11 | 2.5 | 0.2 | Calcium stearate | 0.5 | 29,000 | 240 |
| Example 12 | 2.5 | 0.2 | Melamine | 0.1 | 29,000 | 120 |
| Example 13 | 2.5 | 0.2 | Methylol melamine | 0.1 | 29,000 | 120 |
| Example 14 | 2.5 | 0.2 | Hydrotalcite | 0.01 | 29,000 | 110 |

TABLE 2

| | Oxymethylene copolymer resin | Comonomer | Amount of oxyalkylene monomer units inserted (mol %) | Amount ratio of terminal formate groups ($D_{1710}/D_{1470}$) | Weight decrease ratio R (%) as measured by heating oxymethylene copolymer resin at 230° C. for 100 minutes in nitrogen atmosphere |
|---|---|---|---|---|---|
| Comparative Example 1 | Oxymethylene homopolymer | — | — | Acetyl group | 6.0 |
| Comparative Example 2 | Oxymethylene copolymer | Ethylene oxide | 1.6 | 0.018 | 0.1 |
| Comparative Example 3 | Sample F | 1,3-dioxolane | 0.03 | 0.018 | 3.5 |
| Comparative Example 4 | Sample G | 1,3-dioxolane | 0.8 | 0.013 | 0.2 |
| Comparative Example 5 | Sample A | 1,3-dioxolane | 0.2 | 0.015 | 0.8 |

TABLE 2-continued

| | | | | | |
|---|---|---|---|---|---|
| Comparative Example 6 | Sample A | 1,3-dioxolane | 0.2 | 0.015 | 0.8 |
| Comparative Example 7 | Sample A | 1,3-dioxolane | 0.2 | 0.015 | 0.8 |
| Comparative Example 8 | Sample A | 1,3-dioxolane | 0.2 | 0.015 | 0.8 |

| | Poly-β-alanine | | Basic substance | | | Time required for weight of oxymethylene copolymer resin composition to decrease |
|---|---|---|---|---|---|---|
| | Average particle diameter (μm) | Amount (part by weight) | Type | Amount (part by weight) | Flexural modulus (kg/cm²) | by 20%, based on the original weight, at 230° C. in an oxygen-containing atmosphere (min) |
| Comparative Example 1 | 2.5 | 0.2 | — | — | 30,800 | 10 |
| Comparative Example 2 | 2.5 | 0.2 | — | — | 23,000 | 200 |
| Comparative Example 3 | 2.5 | 0.2 | — | — | 30,000 | 40 |
| Comparative Example 4 | 2.5 | 0.2 | — | — | 25,000 | 180 |
| Comparative Example 5 | — | — | — | — | 29,000 | 15 |
| Comparative Example 6 | 2.5 | 0.003 | — | — | 29,000 | 15 |
| Comparative Example 7 | 2.5 | 5 | — | — | 29,000 | 250 |
| Comparative Example 8 | 30 | 0.3 | — | — | 29,000 | 30 |

INDUSTRIAL APPLICABILITY

The oxymethylene copolymer resin composition of the present invention exhibits not only mechanical properties which are comparable or superior to the mechanical properties of conventional oxymethylene polymer compositions as well as conventional oxymethylene polymers, but also exhibits an excellent thermal stability which has not conventionally been achieved. Therefore, the oxymethylene copolymer resin composition of the present invention can be advantageously used as materials for automobile parts, electrical parts, etc.

We claim:

1. An oxymethylene copolymer resin composition comprising:
    (A) 100 parts by weight of an oxymethylene copolymer resin comprising a plurality of oxymethylene copolymer chains, each comprising recurring oxymethylene monomer units and oxyalkylene monomer units inserted therein, wherein said oxyalkylene monomer units, each having at least 2 carbon atoms, are present in said oxymethylene copolymer resin in an amount of from 0.05 to 0.5 mol %, based on said oxymethylene monomer units,
    said plurality of oxymethylene copolymer chains collectively having, as terminal groups, alkoxyl groups each having at least one carbon atom, hydroxyalkyl groups each having at least 2 carbon atoms, and formate groups;
    (B) 0.01 to 3.0 parts by weight of a poly-β-alanine having an average particle diameter of 6 μm or less; and
    (C) 0.05 to 0.6 part by weight, per 100 parts by weight of said oxymethylene copolymer resin, of an alkaline earth metal salt of an organic fatty acid.

2. The oxymethylene copolymer resin composition according to claim 1, wherein each oxyalkylene monomer unit independently has 2 to 10 carbon atoms, each terminal alkoxyl group independently has 1 to 10 carbon atoms, and each terminal hydroxyalkyl group independently has 2 to 10 carbon atoms.

3. The oxymethylene copolymer resin composition according to claim 1, wherein said oxymethylene copolymer resin (A) exhibits a weight decrease ratio R of 3% or less as measured by heating said oxymethylene copolymer resin at a temperature of 230° C. for 100 minutes in a nitrogen atmosphere, said weight decrease ratio R being defined by the formula:

$$R\ (\%) = \frac{W_1 - W_2}{W_1} \times 100$$

wherein $W_1$ is the weight of the oxymethylene copolymer resin before the heating, and $W_2$ is the weight of the oxymethylene copolymer resin after the heating.

4. The oxymethylene copolymer resin composition according to claim 1, 2 or 3, wherein said oxymethylene copolymer resin (A) exhibits in the infrared absorption spectrum thereof an absorbance $D_{1710}$ ascribed to the terminal formate groups at the wave number of 1710 cm$^{-1}$ and an absorbance $D_{1470}$ ascribed to the oxymethylene groups at the wave number of 1470 cm$^{-1}$, wherein $D_{1710}$ and $D_{1470}$ satisfy the relationship defined by the formula:

$$D_{1710}/D_{1470} \leq 0.025.$$

* * * * *